(12) United States Patent
Tsuji

(10) Patent No.: US 9,813,569 B2
(45) Date of Patent: Nov. 7, 2017

(54) DISPLAY INPUT DEVICE AND IMAGE FORMING APPARATUS INCLUDING SAME, AND METHOD FOR CONTROLLING DISPLAY INPUT DEVICE

(71) Applicant: KYOCERA Document Solutions Inc., Osaka (JP)

(72) Inventor: Takuya Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/057,748

(22) Filed: Mar. 1, 2016

(65) Prior Publication Data
US 2016/0261768 A1  Sep. 8, 2016

(30) Foreign Application Priority Data
Mar. 6, 2015  (JP) ................................. 2015-044323

(51) Int. Cl.
*H04N 1/00* (2006.01)

(52) U.S. Cl.
CPC ................................. *H04N 1/00411* (2013.01)

(58) Field of Classification Search
CPC .. H04N 1/393; H04N 1/3873; H04N 1/00411; G06F 3/04883; G06F 3/04815; G06F 3/017
See application file for complete search history.

(56) References Cited

U.S. PATENT DOCUMENTS

| 2010/0060588 | A1* | 3/2010 | Fong | G06F 3/04883 345/173 |
| 2011/0041098 | A1* | 2/2011 | Kajiya | G06F 3/04815 715/849 |
| 2013/0222313 | A1 | 8/2013 | Nakamura et al. | 345/173 |
| 2014/0007021 | A1* | 1/2014 | Akiyama | G06F 3/017 715/863 |

FOREIGN PATENT DOCUMENTS

JP  2012-70310 A  4/2012

* cited by examiner

*Primary Examiner* — Richard Hong
(74) *Attorney, Agent, or Firm* — Stein IP, LLC

(57) ABSTRACT

When a display changing operation is performed after a shift is made to a rotation mode, a display input device performs a rotation display of an object, and increases a rotation angle of the object per unit movement amount of a predetermined touch point according as a distance between two points touched in a mode switching operation is larger. When a display changing operation is performed after a shift to an enlargement/reduction mode, the display input device performs an enlargement/reduction display of the object, and increases an enlargement amount or a reduction amount of the object per unit movement amount of the predetermined touch point according as the distance between the two touch points touched in the mode switching operation is larger.

9 Claims, 13 Drawing Sheets

DISPLAY OF OBJECT

ROTATION OF OBJECT

DISPLAY INPUT DEVICE AND IMAGE FORMING APPARATUS INCLUDING SAME, AND METHOD FOR CONTROLLING DISPLAY INPUT DEVICE

INCORPORATION BY REFERENCE

This application is based upon and claims the benefit of priority from the corresponding Japanese Patent Application No. 2015-044323 filed on Mar. 6, 2015, the entire contents of which are incorporated herein by reference.

BACKGROUND

The present disclosure relates to a display input device and an image forming apparatus including the same, and also relates to a method for controlling a display input device.

Conventionally, display input devices are known that each include a display section that displays various objects, and a touch panel section disposed at the display section for detecting a touch operation. Examples of such conventional display input devices include one that displays a still image as an object and allows the object to be edited (to be rotated or enlarged/reduced, for example).

Such a display input device accepts a touch operation for editing the object via a touch panel section while the object is being displayed. For example, a currently displayed object can be rotated by a touch operation performed by first touching two positions on the touch panel section and then moving one of the two touched positions in arc around the other touched position, which is kept stationary. Further, the currently displayed object can be enlarged by first touching two positions on the touch panel section and then increasing the distance between the two touched positions, while the currently displayed object can be reduced by reducing the distance between the two touched positions.

SUMMARY

According to a first aspect of the present disclosure, a display input device includes a display section, a touch panel section, and a control section. The display section displays an object. The touch panel section is provided for detecting a touch operation and disposed at the display section. The control section detects a touch operation based on an output from the touch panel section. On detecting that a mode switching operation has been performed on the touch panel section, the mode switching operation being a touch operation in which two touches are made by touching two points as two touch points on the touch panel section and then one of the two touches is released, leaving one of the two touch points continuously touched as a continuous touch point, the control section makes a shift to a rotation mode or to an enlargement/reduction mode. In a case where a shift has been made to the rotation mode, when a display changing operation is performed on the touch panel section, the display changing operation being a touch operation in which a point is newly touched as a new touch point besides the continuous touch point which has been continuously touched ever since the mode switching operation and then a position of the new touch point or of the continuous touch point is moved, the control section makes the display section perform a rotation display in which the object is rotated according as the predetermined touch point moves, the predetermined touch point being a touch point a position of which is moved in the display changing operation, and when making the display section perform the rotation display, the control section makes the display section increase a rotation angle of the object per unit movement amount of the predetermined touch point according as a distance between the two touch points touched in the mode switching operation is larger. In a case where a shift has been made to the enlargement/reduction mode, when the display changing operation is performed on the touch panel section, the control section makes the display section perform an enlargement/reduction display in which the object is enlarged or reduced according as the predetermined touch point moves, and when making the display section perform the enlargement/reduction display, the control section makes the display section increase an enlargement amount or a reduction amount of the object per unit movement amount of the predetermined touch point according as the distance between the two touch points touched in the mode switching operation is larger.

According to a second aspect of the present disclosure, an image forming apparatus includes the above-described display input device.

According to a third aspect of the present disclosure, a method for controlling a display input device is a method for controlling a display input device including a display section that displays an object, and a touch panel section for detecting a touch operation, the touch panel section being disposed at the display section, and the method includes a step of displaying the object at the display section, a step of making a shift to a rotation mode or to an enlargement/reduction mode when a mode switching operation is detected to have been performed on the touch panel section while the object is being displayed, the mode switching operation being a touch operation in which two touches are made by touching two points as two touch points on the touch panel section and then one of the two touches is released, leaving one of the two touch points continuously touched as a continuous touch point, and a step where, in a case in which a shift has been made to the rotation mode, when a display changing operation is performed on the touch panel section, the display changing operation being a touch operation in which a point is newly touched as a new touch point besides the continuous touch point which has been continuously touched ever since the mode switching operation and then a position of the new touch point of the continuous touch point is moved, the display section is made to perform a rotation display in which the object is rotated according as a predetermined touch point moves, the predetermined touch point being a touch point a position of which is moved in the display changing operation, and when being made to perform the rotation display, the display section is made to increase a rotation angle of the object per unit movement amount of the predetermined touch point according as a distance between the two touch points touched in the mode switching operation is larger, and where, in a case in which a shift has been made to the enlargement/reduction mode, when the display changing operation is performed on the touch panel section, the display section is made to perform an enlargement/reduction display in which the object is enlarged or reduced according as the predetermined touch point moves, and when being made to perform the enlargement/reduction display, the display section is made to increase an enlargement amount or a reduction amount of the object per unit movement amount of the predetermined touch point according as a distance between the two touch points touched in the mode switching operation is larger.

DETAILED DESCRIPTION

Hereinafter, descriptions will be given of an image forming apparatus according to an embodiment of the present disclosure, dealing, as an example, with a multifunction peripheral equipped with a plurality of kinds of functions such as a copy function and a transmission function (a fax function).

Figure 1:
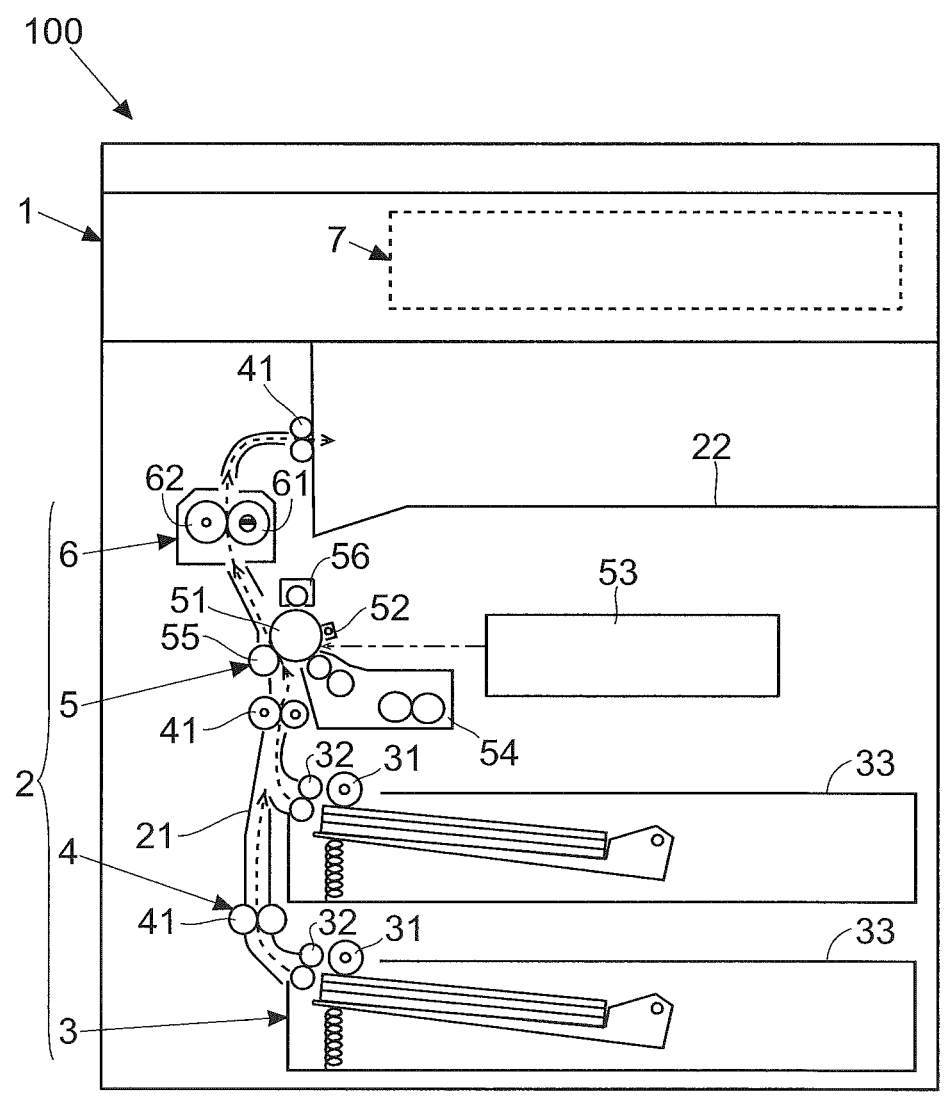
FIG. 1 is a diagram illustrating an example of a multifunction peripheral according to an embodiment of the present disclosure.

Overall Configuration of Multifunction Peripheral:

As illustrated in FIG. 1, a multifunction peripheral 100 (equivalent to an "image forming apparatus") includes an image reading section 1 and a printing section 2. The image reading section 1 reads a document and generates image data of the document. The printing section 2 conveys a sheet along a sheet conveyance path 21 and forms a toner image based on the image data. Then, the printing section 2 transfers (prints) the toner image onto the sheet under conveyance, and delivers the printed sheet to a delivery tray 22.

The printing section 2 includes a sheet feeding section 3, a sheet conveying section 4, an image forming section 5, and a fixing section 6. The sheet feeding section 3 includes a pickup roller 31 and sheet feeding roller pair 32, and supplies a sheet stored in either of sheet cassettes 33 to the sheet conveying path 21. The sheet conveying section 4 includes a plurality of conveyance roller pairs 41, and conveys a sheet along the sheet conveying path 21.

The image forming section 5 includes a photosensitive drum 51, a charging device 52, an exposing device 53, a developing device 54, a transfer roller 55, and a cleaning device 56. The image forming section 5 forms the toner image based on the image data, and transfers the toner image onto a sheet. The fixing section 6 includes heat roller 61 and a pressure roller 62, and applies heat and pressure to the toner image transferred onto the sheet to thereby fix the toner image.

The multifunction peripheral 100 is provided with an operation panel 7. The operation panel 7 is disposed on a front side (at a position indicated by a broken line in FIG. 1) of the multifunction peripheral 100. The operation panel 7 functions as a computer that operates based on an internally-stored program P (see FIG. 3). Based on the program P, the operation panel 7 executes processing including processing of accepting a mode switching operation and a display changing operation, which will be described later and processing of changing of changing display in response to the display changing operation. The operation panel 7 corresponds to a "display input device".

Figure 2:
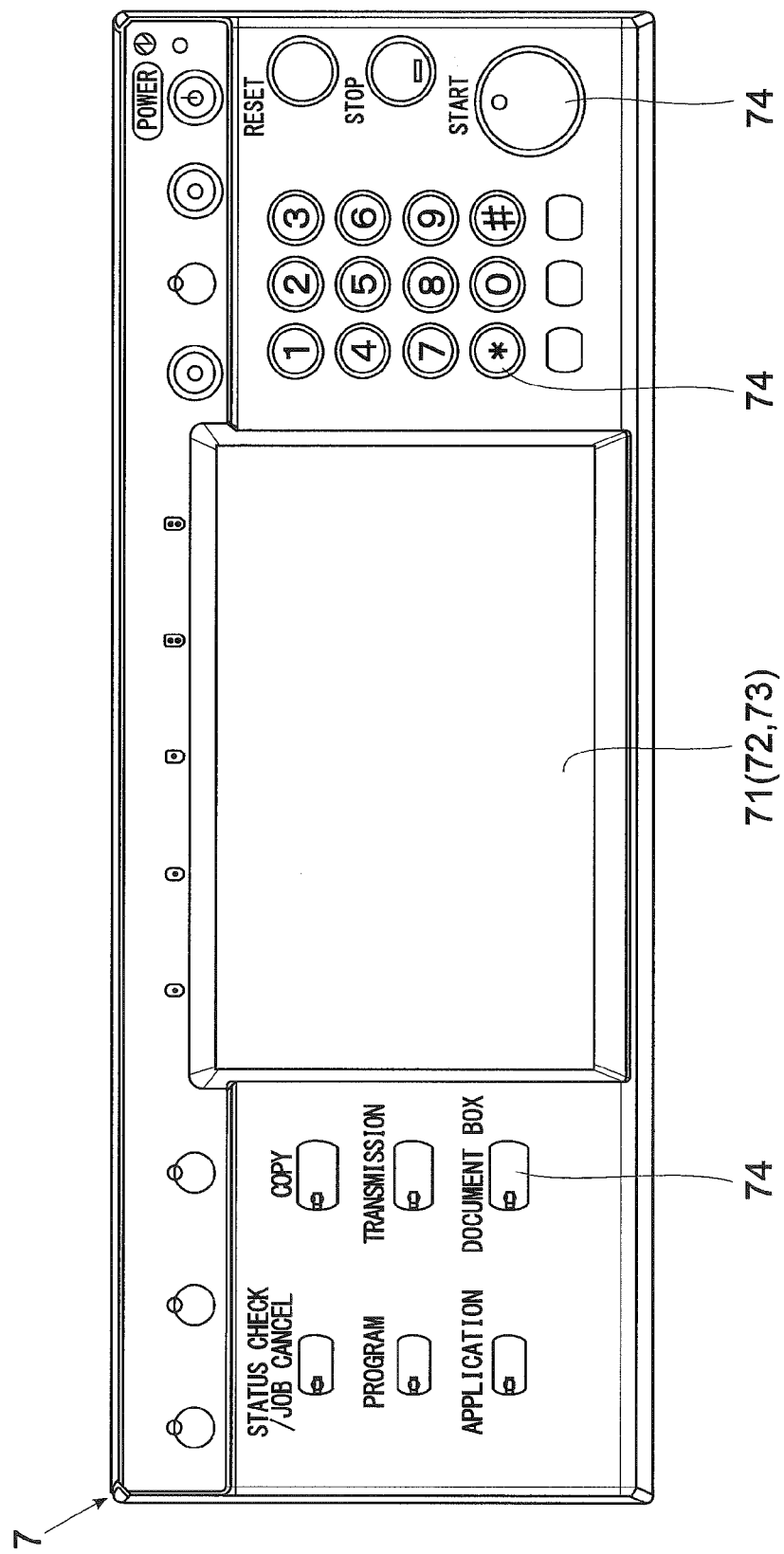
FIG. 2 is a diagram illustrating an example of an operation panel according to an embodiment of the present disclosure.

The operation panel 7 is provided with an operation display section 71 as illustrated in FIG. 2. The operation display section 71 includes a display section 72 and a touch panel section 73. The display section 72 is a display panel, such as a liquid crystal display panel and an organic EL display panel. The touch panel section 73, which is provided at the display section 72, is a multi-touch panel capable of simultaneously detecting a plurality of touch positions. The operation display section 71 displays soft keys for accepting various settings, messages, and the like on the display section 72, and accepts various settings via the touch panel section 73. Here, the operation panel 7 is provided also with various hard keys 74 including a start key, a stop key, a reset key, and a ten-key pad.

Figure 3:
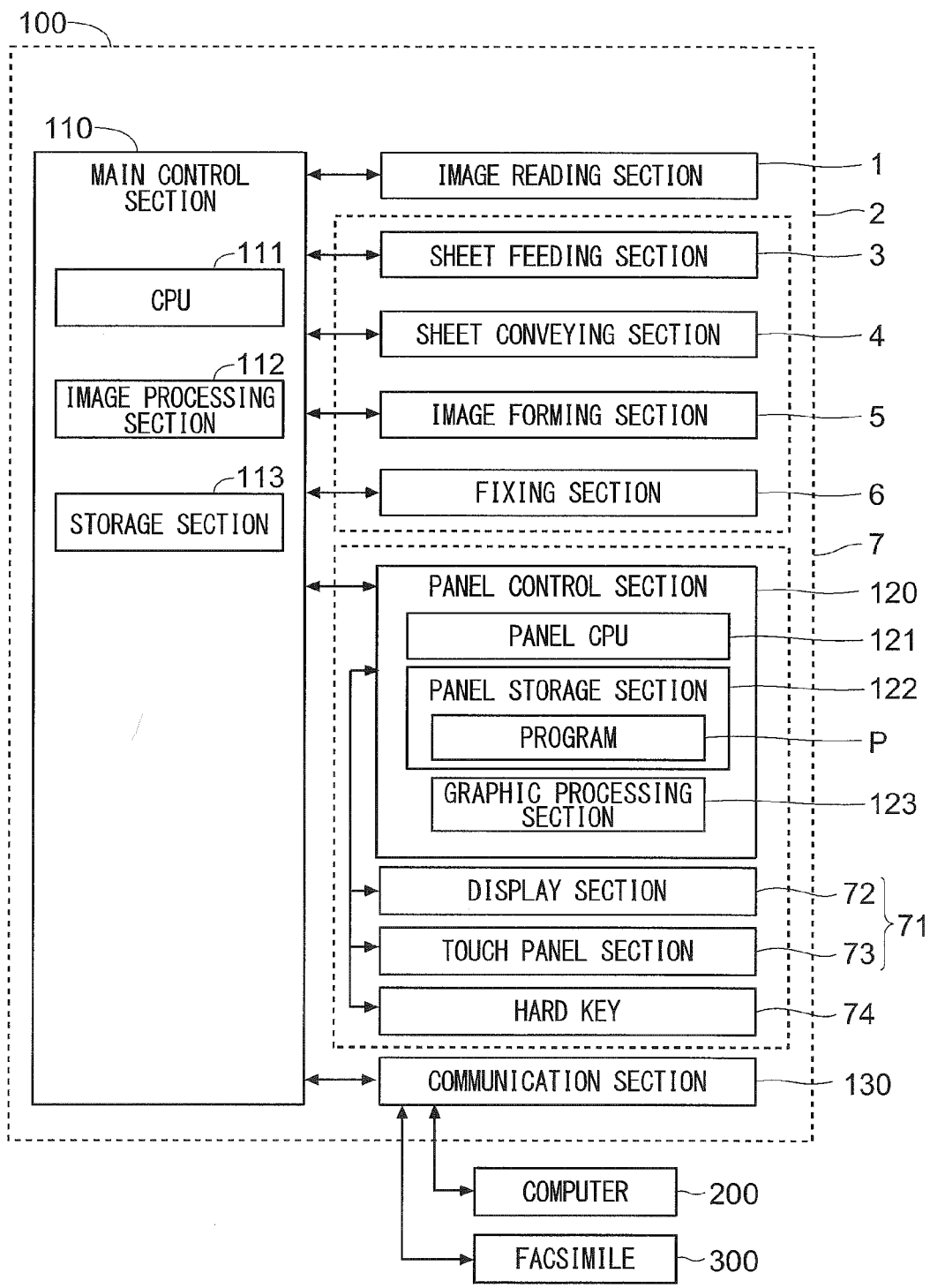
FIG. 3 is a diagram illustrating an example of a hardware configuration of a multifunction peripheral (an operation panel) according to an embodiment of the present disclosure.

Hardware Configuration of Multifunction Peripheral:

As illustrated in FIG. 3, the multifunction peripheral 100 includes a main control section 110. The main control section 110 includes a CPU 111, an image processing section 112, a storage section 113, etc. The image processing section 112 is constituted by, for example, an ASIC dedicated for image processing, and performs image processing (enlargement/reduction, density conversion, data format conversion, etc.) on image data. The storage section 113 is constituted by a ROM and a RAM, for example, and stores therein a program and data for control. Based on the program and data for control stored in the storage section 113, the main control section 110 controls operations of the image reading section 1 and the printing section 2 (the sheet feeding section 3, the sheet conveying section 4, the image forming section 5, and fixing section 6).

The operation panel 7 is provided with a panel control section 120 that is connected to the main control section 110. The panel control section 120 includes a panel CPU 121 and a panel storage section 122 (memory). In the panel storage section 122, there is stored a program P for executing various kinds of processing. The panel control section 120 controls, for example, a display operation of the display section 72, and detects a touch operation performed on a screen displayed at the display section 72 based on an output from the touch panel section 73. The panel control section 120 also detects a depressing operation performed on the hard keys 74. Here, the panel control section 120 is equivalent to a "control section".

For example, the panel control section 120 makes the display section 72 display a screen where a soft key and the like are arranged, and when a touch operation is performed on the soft key, the panel control section 120 detects, based on the output from the touch panel section 73, the soft key on which the touch operation has been performed. Then, the panel control section 120 makes the display section 72 display a screen corresponding to the detected soft key.

Further, the panel control section 120 makes the display section 72 display a screen where an object (guidance information) for providing guidance regarding a jam releasing operation, for example. For example, the object for the jam releasing operation is an image of the multifunction peripheral 100 in a state where a cover (or any of various sections) to be opened to release paper jam is opened, and is two-dimensionally or three-dimensionally displayed when paper jam has occurred.

For three-dimensional display of the object, a three-dimensional form model is stored in the panel storage section 122. The panel control section 120 generates image data for the three-dimensional display of the object based on the three-dimensional model, and makes the display section 72 display the object in a three-dimensional form. The three-dimensional model indicates, for example, vertex coordinates and color of a polygon plane to be used to display the object three-dimensionally. Here, in order to display the object three-dimensionally, a dedicated graphic processing section 123 including a graphic processing unit (GPU) may be provided at the panel control section 120. For example, by performing processing such as processing of changing the vertex coordinates of the polygon constituting the three-dimensional model, the graphic processing section 123 generates image data for displaying the three-dimensionally displayed object as having been rotated (or enlarged/reduced).

The main control section 110 is connected also to a communication section 130. The communication section 130 is communicably connected to an external computer 200 via a network. Thereby, it is possible to perform printing based on image data transmitted from the computer 200, and also to transmit to the computer 200 image data obtained by reading a document. Further, a modem or the like may be incorporated in the communication section 130. In this case, fax communication is possible with an external facsimile 300 via a network such as a telephone line.

Mode Switching:

While the display section 72 is displaying a previously determined object, the panel control section 120 makes the touch panel section 73 accept an instruction to switch to a mode for changing the display of the object (to rotate or enlarge/reduce the object). There is no particular limitation to the object as a target display of which is to be changed here; the object is displayed three-dimensionally and indicates guidance information, for example.

Hereinafter, a specific description will be given of a mode switching operation. For convenience, the object as the target of changing is indicated as a hexahedron in the drawings referred to in the following description. Further, a touch point (a touch position) is indicated by a white circle, and a direction in which a touch point moves is indicated by a white arrow. Also, in the following description, the object as the target of the display change will be referred to as an "object 80".

Figure 4:
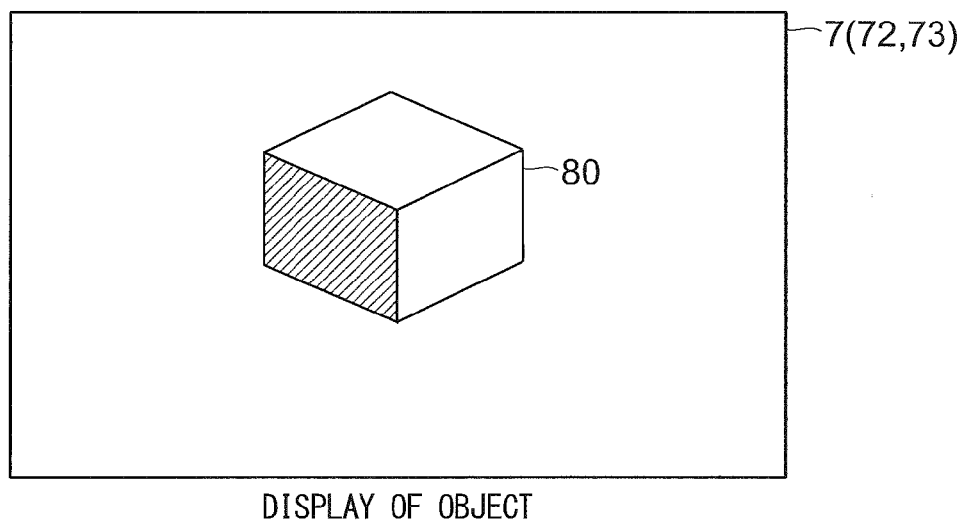
FIG. 4 is a simplified schematic diagram illustrating an object displayed on an operation panel according to an embodiment of the present disclosure.
Figure 5:
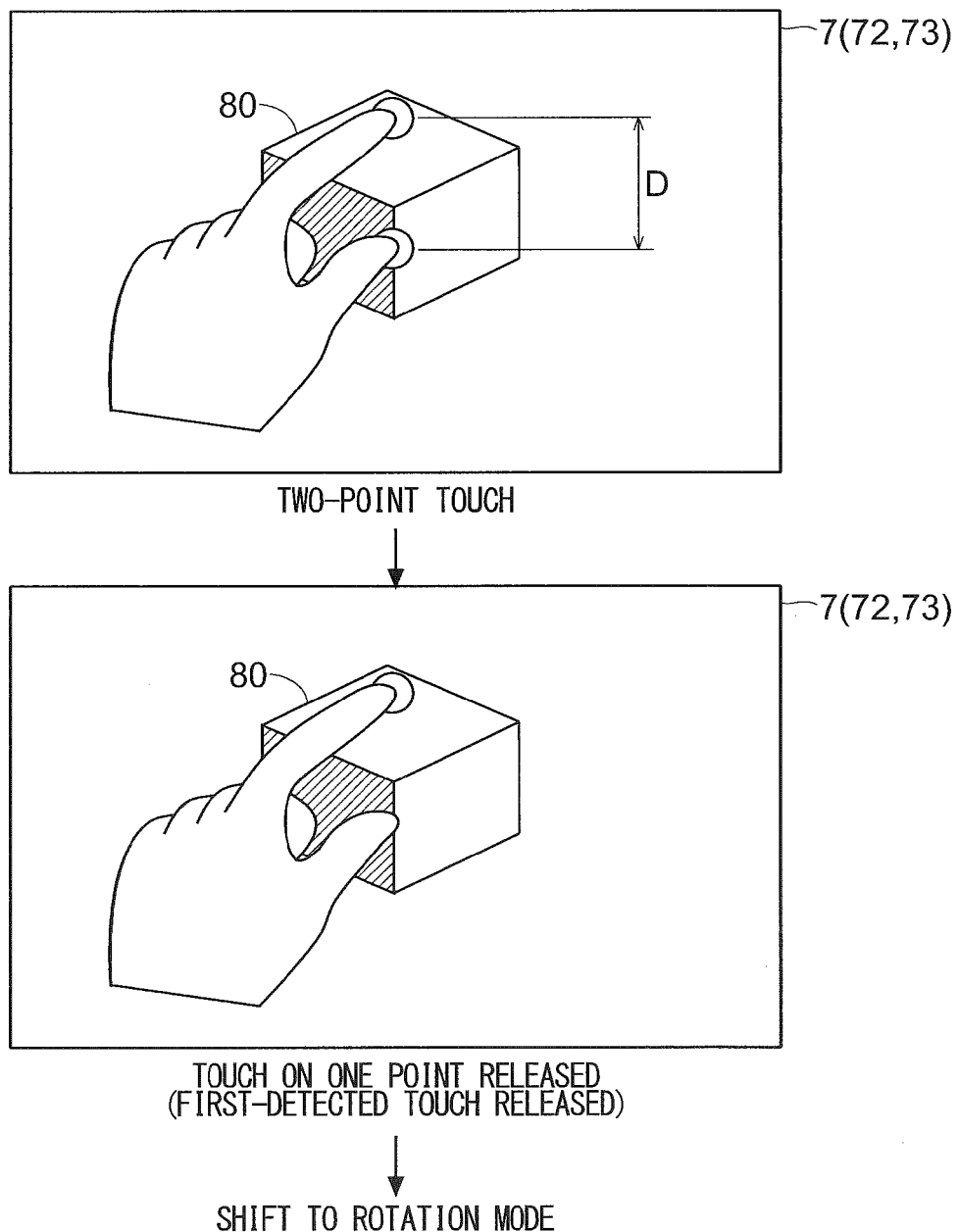
FIG. 5 is a diagram for illustrating a mode switching operation for making an operation panel according to an embodiment of the present disclosure shift to a rotation mode.
Figure 6:
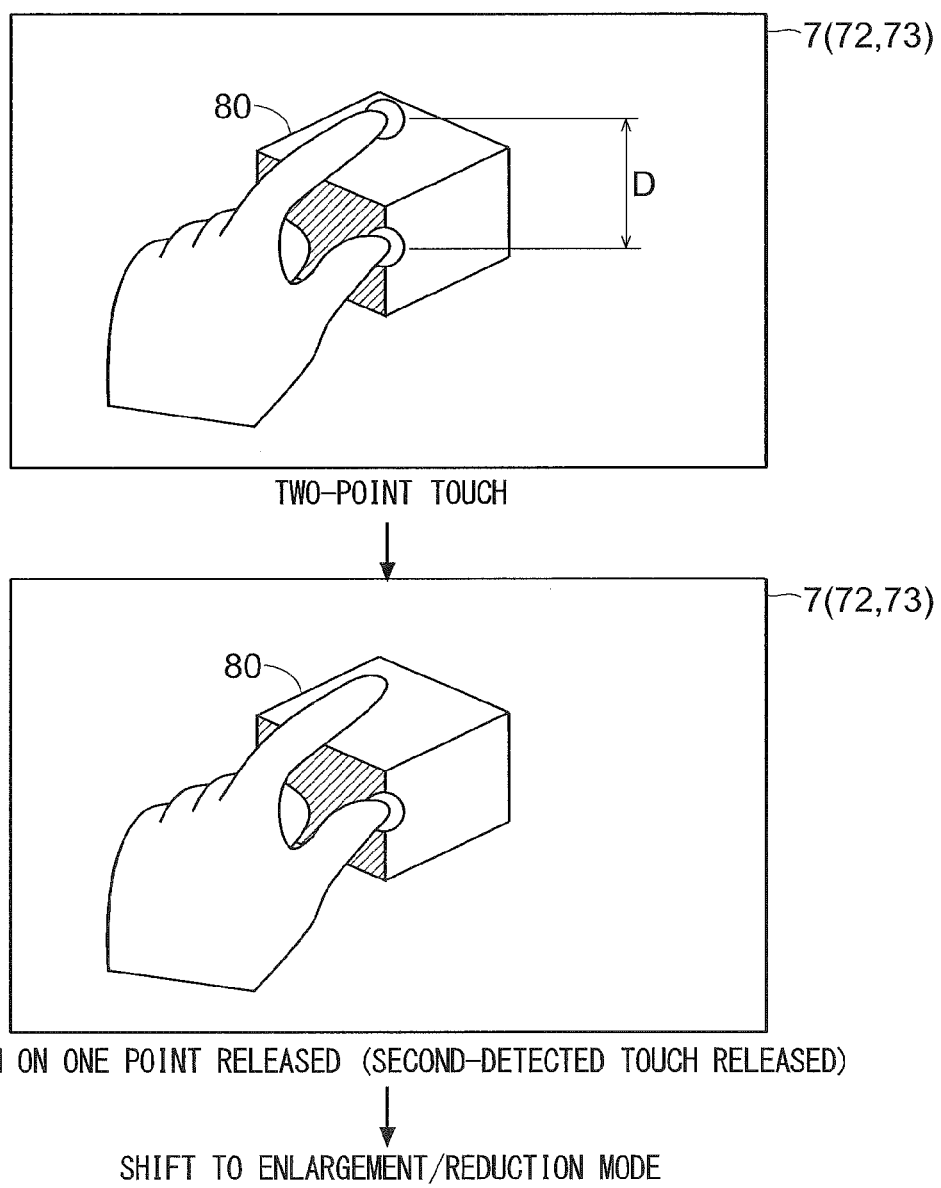
FIG. 6 is a diagram for illustrating a mode switching operation for making an operation panel according to an embodiment of the present disclosure shift to an enlargement/reduction mode.

First, assume that an object 80 as illustrated in FIG. 4 is displayed on the display section 72. In this state, when an operation of touching two points and then releasing touch with respect to one of the two points is performed on the touch panel section 73 as illustrated in FIG. 5 and FIG. 6, the panel control section 120 judges that the touch panel section 73 has accepted a mode switching operation (which is a touch operation for switching to a mode for changing display of the object 80). In the case where the touch panel section 73 has accepted the mode switching operation, the panel control section 120 makes a shift to a rotation mode or to an enlargement/reduction mode. In other words, the panel control section 120 makes the display section 72 perform display in the rotation mode or the enlargement/reduction mode. Here, the rotation mode is a mode in which is performed a rotational display in which the object 80 is rotated. The enlargement/reduction mode is a mode in which is performed an enlargement/reduction display in which the object 80 is enlarged/reduced.

For example, as illustrated in FIG. 5, the panel control section 120 makes a shift to the rotation mode in a case where, a first-detected one (in FIG. 5, the touch made by the thumb) of the touches on two points detected in the mode switching operation is released. On the other hand, as illustrated in FIG. 6, the panel control section 120 makes a shift to the enlargement/reduction mode in a case where, a second-detected one (in FIG. 6, the touch made by the index finger) of the touches on the two points detected in the mode switching operation is released.

Here, a shift may be made to the enlargement/reduction mode in the case where the first-detected one of the touches on the two points detected in the mode switching operation is released, and a shift may be made to the rotation mode in the case where the second-detected one of the touches on the two points detected in the mode switching operation is released.

Figure 7:
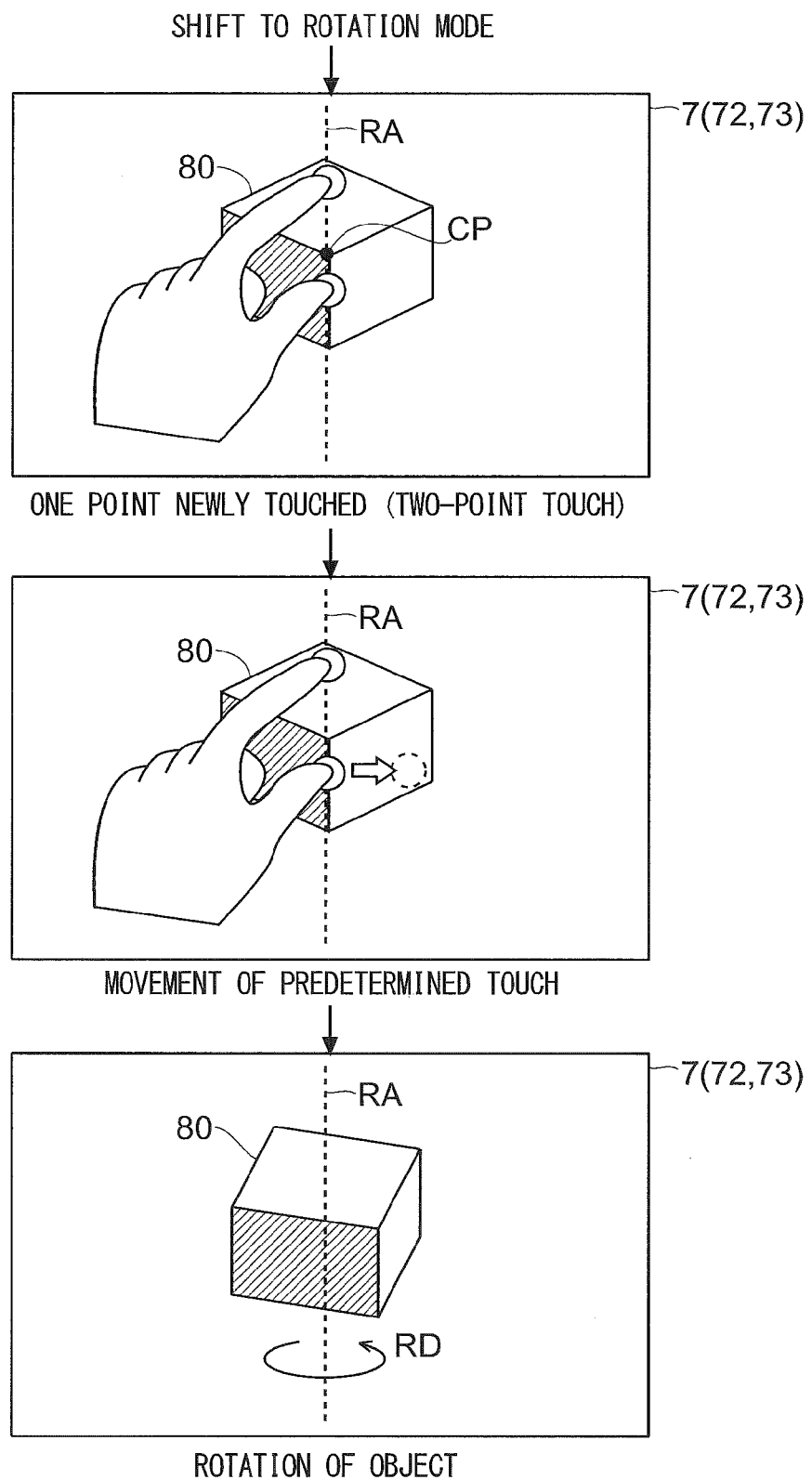
FIG. 7 is a diagram for illustrating a display changing operation for rotating an object displayed on an operation panel according to an embodiment of the present disclosure.

Display in Rotation Mode:

As illustrated in FIG. 7, in a case where a shift has been made to the rotation mode, the panel control section 120 makes a judgment on whether or not the touch panel section 73 has accepted the display change operation previously determined as a touch operation for changing the display of object 80. For example, when the panel control section 120 detects that a touch operation has been performed on the touch panel section 73 in which a touch is made on a new point that is different from the point continuously touched ever since the mode switching operation, and then the position of either one of the two touch points including the newly touched point is moved, the panel control section 120 judges that the touch panel section 73 has accepted a display changing operation. In the following description, a touch point the position of which is moved in the display changing operation may sometimes be referred to as a predetermined touch point.

For example, accepted as the display changing operation is a touch operation in which the position of the touch point different from the touch point continuously touched ever since the mode switching operation is moved (that is, the position of the touch point newly touched in the display changing operation is moved). However, as the display changing operation, a touch operation may also be accepted in which the position of the touch point continuously touched ever since the mode switching operation is moved. FIG. 7 illustrates, as an example, a case in which is accepted, as the display changing operation, the touch operation in which the position of the touch point that is different from the touch point continuously touched ever since the mode switching operation is moved (that is, the position of the touch point touched by the thumb is moved).

Here, in the case where a shift has been made to the rotation mode, the panel control section 120 sets, as a rotation axis RA, a straight line that passes through one of the two touch points detected to have been touched in the mode switching operation (for example, the one touch point a touch on which has been detected first in the mode switching operation) and a previously determined center point CP of the object 80. The thus set rotation axis RA may be, but does not have to be, displayed.

Then, when making the display section 72 perform the rotation display, the panel control section 120 makes a judgment on whether a movement direction of a predetermined touch point in the display changing operation is a direction toward one region or the other region (a region on the side opposite to the one region) of two regions which are divided by the rotation axis RA. In a case where it is determined as a result of the judgement that the movement direction of the predetermined touch point in the display changing operation is the direction toward the one region, the panel control section 120 makes the object 80 rotate in previously determined direction RD (a direction around the rotation axis RA) according as the predetermined touch point moves. At this time, the panel control section 120 generates image data of the object 80 rotated in direction RD, and makes the display section 72 perform display of the object 80 based on the image data.

On the other hand, although not illustrated, in a case where the movement direction of the predetermined touch point touched in the display changing operation is the direction toward the other region, the panel control section 120 makes the object 80 rotate in a direction (a direction around the rotation axis RA) that is reverse to direction RD according as the predetermined touch point moves. That is, the rotation direction of the object 80 depends on the movement direction of the predetermined touch point.

In FIG. 7, the rotation axis RA is illustrated as a straight line extending on the display screen in an up-down direction; however, depending on a touch position in the mode switching operation, the rotation axis RA may be a straight line extending on the display screen in a right-left direction, or may be a line extending on the display screen in an oblique direction with respect to the up-down direction and the right-left direction. In these cases as well, when the display changing operation is performed on the touch panel section 73, the panel control section 120 instructs the display section 72 to rotate the object 80 in a direction around the rotation axis RA.

Further, the panel control section 120 makes the display section 72 perform the rotation display in such a manner that the larger a distance D between the two points touched in the mode switching operation (see FIG. 5) is, the larger a rotation angle of the object 80 is by which the object 80 rotates per unit movement amount of the predetermined touch point in the display changing operation (the rotation angle is a value that indicates how much the object 80 is to be rotated per unit movement amount). That is, when the distance D between the two touch points touched in the mode switching operation is small, the rotation angle of the object 80 per unit movement amount of the predetermined touch point becomes accordingly small. For example, the distance D is classified into a plurality of classes (in increments of several millimeters to several tens of millimeters, for example), and rotation information including previously determined rotation angles corresponding to the plurality of classes of the distance D is stored in the storage section 122.

And, when the mode switching operation is performed on the touch panel section 73, the panel control section 120 detects the distance D between the two points touched in the mode switching operation, and sets a rotation angle corresponding to the detected distance D as the rotation angle by which the object 80 is to be rotated per unit movement amount of the predetermined touch point.

Figure 8:
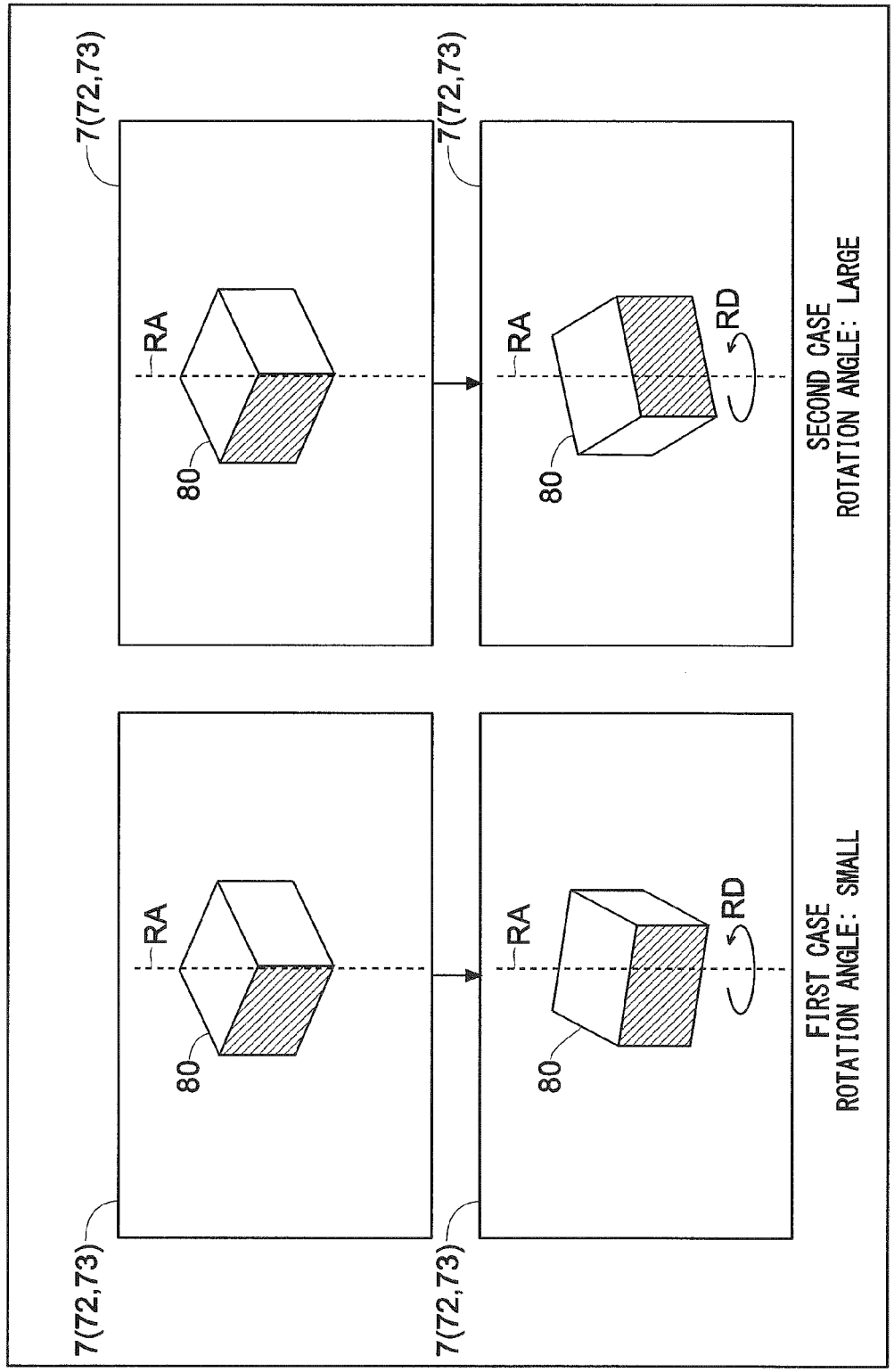
FIG. 8 is a diagram for illustrating rotation angles by which is rotated an object that is displayed on an operation panel according to an embodiment of the present disclosure.

As a result, as illustrated in FIG. 8, in comparison between a first case where the distance D between the two points touched in the mode switching operation is small and a second case where the distance D between the two points touched in the mode switching operation is larger than in the first case, even when the predetermined touch point in the display changing operation moves by the same movement amount in the first and second cases, the object 80 rotates by a smaller rotation angle in the first case than in the second case.

Figure 9:
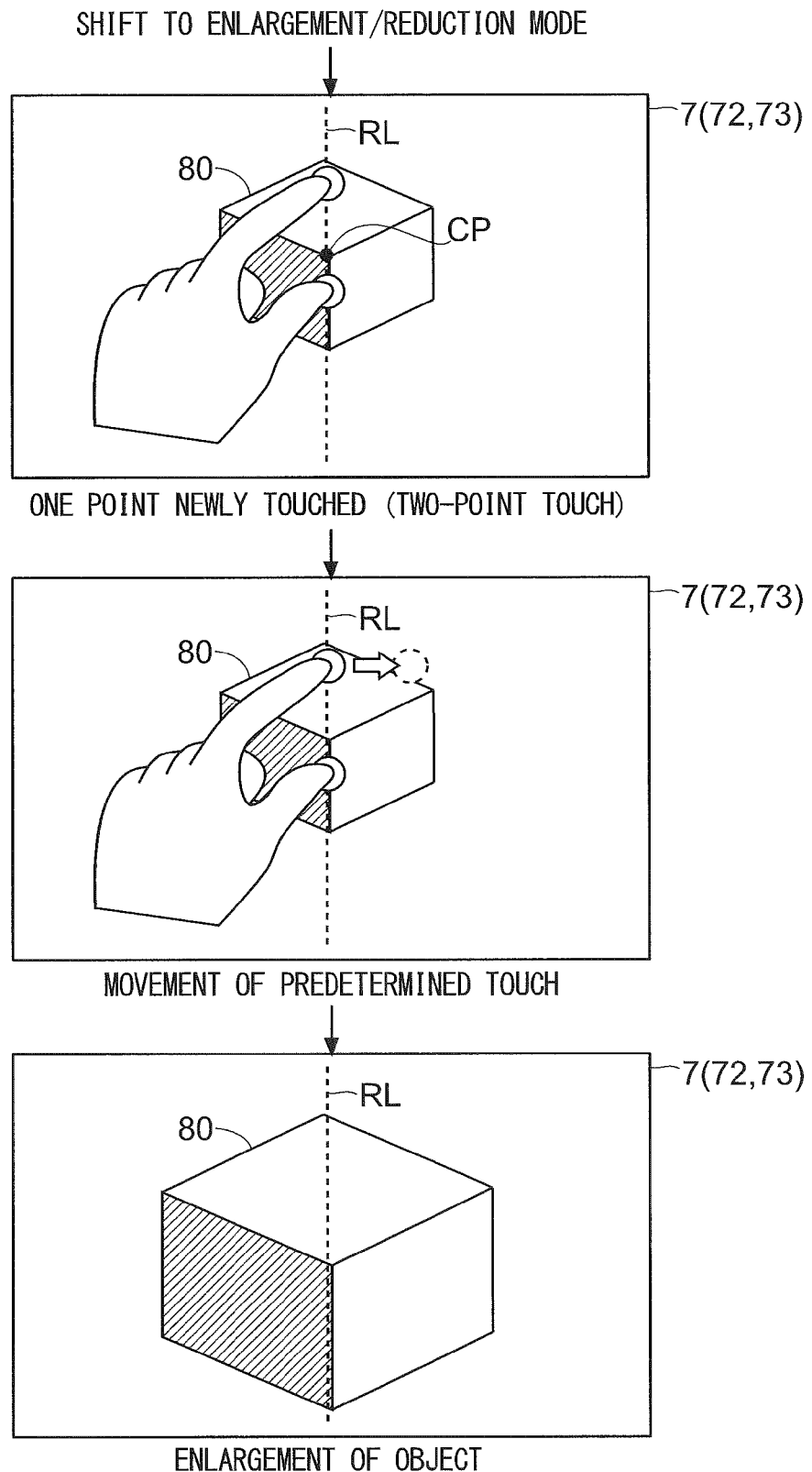
FIG. 9 is a diagram for illustrating a display changing operation for enlarging an object displayed on an operation panel according to an embodiment of the present disclosure.
Figure 10:
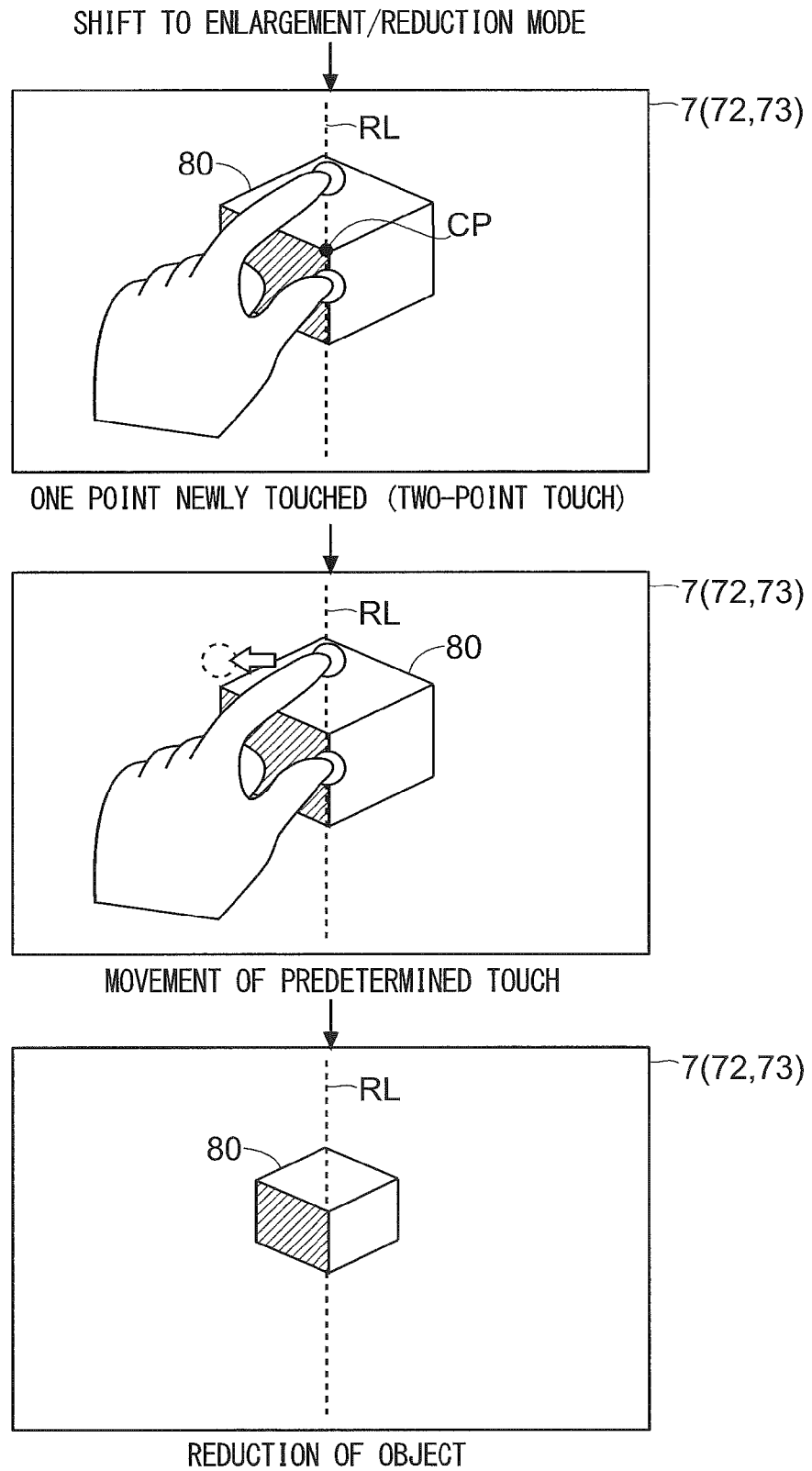
FIG. 10 is a diagram for illustrating a display changing operation for reducing an object displayed on an operation panel according to an embodiment of the present disclosure.

Display in Enlargement/Reduction Mode:

As illustrated in FIG. 9 and FIG. 10, in a case where a shift has been made to the enlargement/reduction mode, the panel control section 120 makes a judgment on whether or not the touch panel section 73 has received a display changing operation, in the same manner as the panel control section 120 does in the case where a shift has been made to the rotation mode. Note that the display changing operation performed in the case where a shift has been made to the rotation mode is regarded as a touch operation instructing to rotate the object 80, while the display changing operation performed in the case where a shift has been made to the enlargement/reduction mode is treated as a touch operation instructing to enlarge/reduce the object 80.

Here, in the case where a shift has been made to the enlargement/reduction mode, the panel control section 120 sets a straight line passing through one touch point (for example, a touch point that has been touched first) of the two touch points detected to have been touched in the mode switching operation and a previously determined center point CP of the object 80 as a reference line RL. The line set as the reference line RL is equivalent to the line set as the rotation axis RA (see FIG. 7) under the rotation mode. The thus set reference line RL may be, but does not have to be, displayed.

Then, when making the display section 72 perform the enlargement/reduction display, the panel control section 120 makes a judgment on whether the movement direction of the predetermined touch point touched in the display changing operation is a direction toward one region or the other region (a region on the side opposite to the one region) of two regions divided by the reference line RL. In a case where it is determined as a result of the judgement that the movement direction of the predetermined touch point touched in the display changing operation is the direction toward the one region, the panel control section 120 gradually enlarges the object 80 according as the predetermined touch point moves (see FIG. 9). On the other hand, in a case where the movement direction of the predetermined touch point touched in the display changing operation is the direction toward the other region, the panel control section 120 gradually reduces the object 80 according as the predetermined touch point moves (see FIG. 10). That is, whether to enlarge or reduce the object 80 is determined depending on the movement direction of the predetermined touch point.

Further, the panel control section 120 makes the display section 72 perform the enlargement/reduction display in such a manner that the larger the distance D between the two points touched in the mode switching operation (see FIG. 6) is, the larger an enlargement amount (a value indicating an amount by which the object 80 is enlarged per unit movement amount) or a reduction amount (a value indicating an amount by which the object 80 is reduced per unit movement amount) is. That is, when the distance D between the two touch points touched in the mode switching operation is small, the enlargement or reduction amount of the object 80 per unit movement amount of the predetermined touch point becomes accordingly small. For example, the distance D is classified into a plurality of classes (in increments of several millimeters to several tens of millimeters, for example), and enlargement/reduction information including previously determined enlargement amounts (reduction amounts) corresponding to the plurality of classes of the distance D is stored in the storage section 122. And, when the mode switching operation is performed on the touch panel section 73, the panel control section 120 detects the distance D between the two points touched in the mode switching operation, and sets an enlargement amount (a reduction amount) corresponding to the detected distance D as the enlargement amount (the reduction amount) by which the object 80 is to be enlarged (reduced) per unit movement amount of the predetermined touch point.

Figure 11:
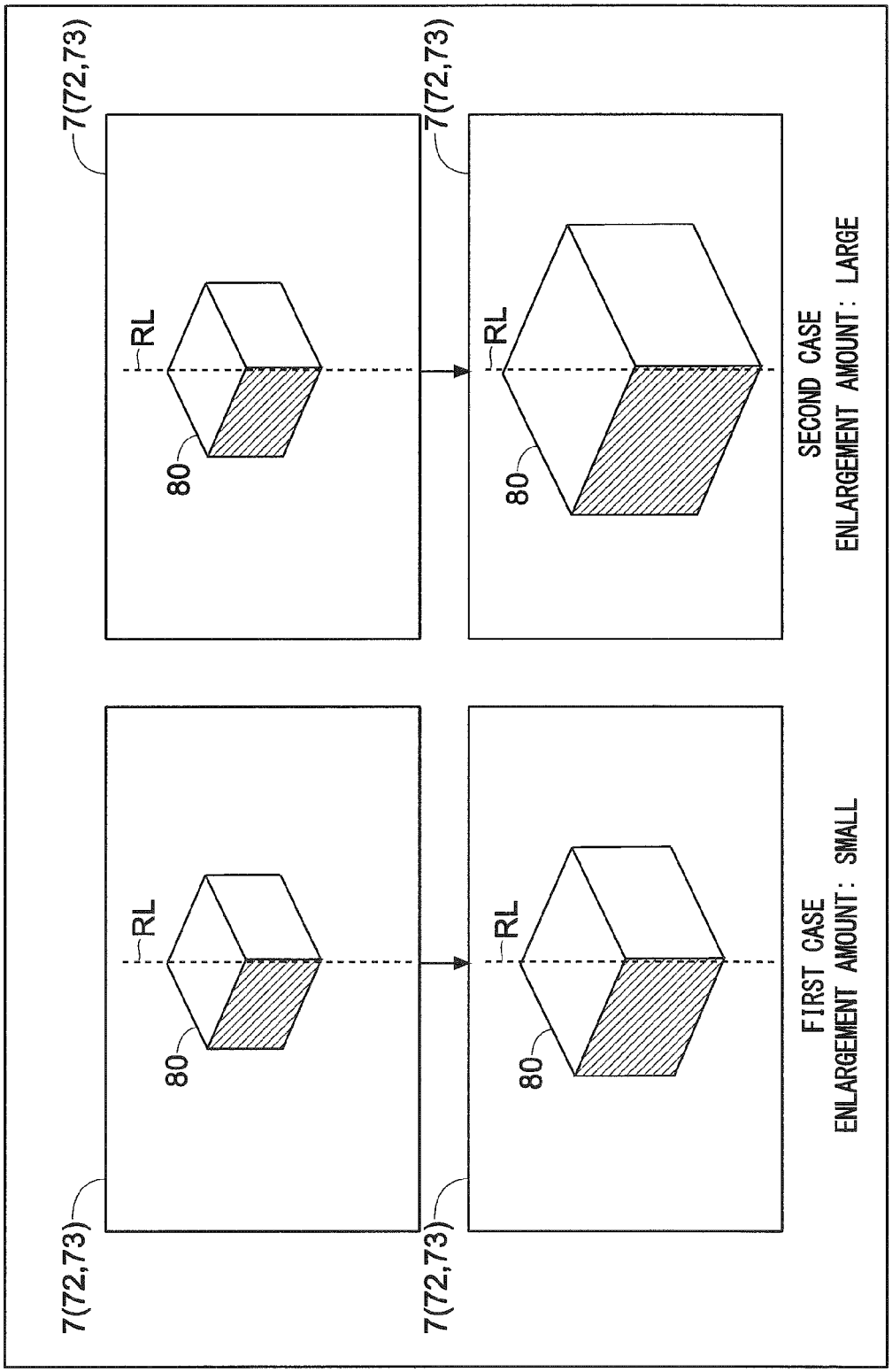
FIG. 11 is a diagram for illustrating an enlargement amount by which is enlarged an object that is displayed on an operation panel according to an embodiment of the present disclosure.
Figure 12:
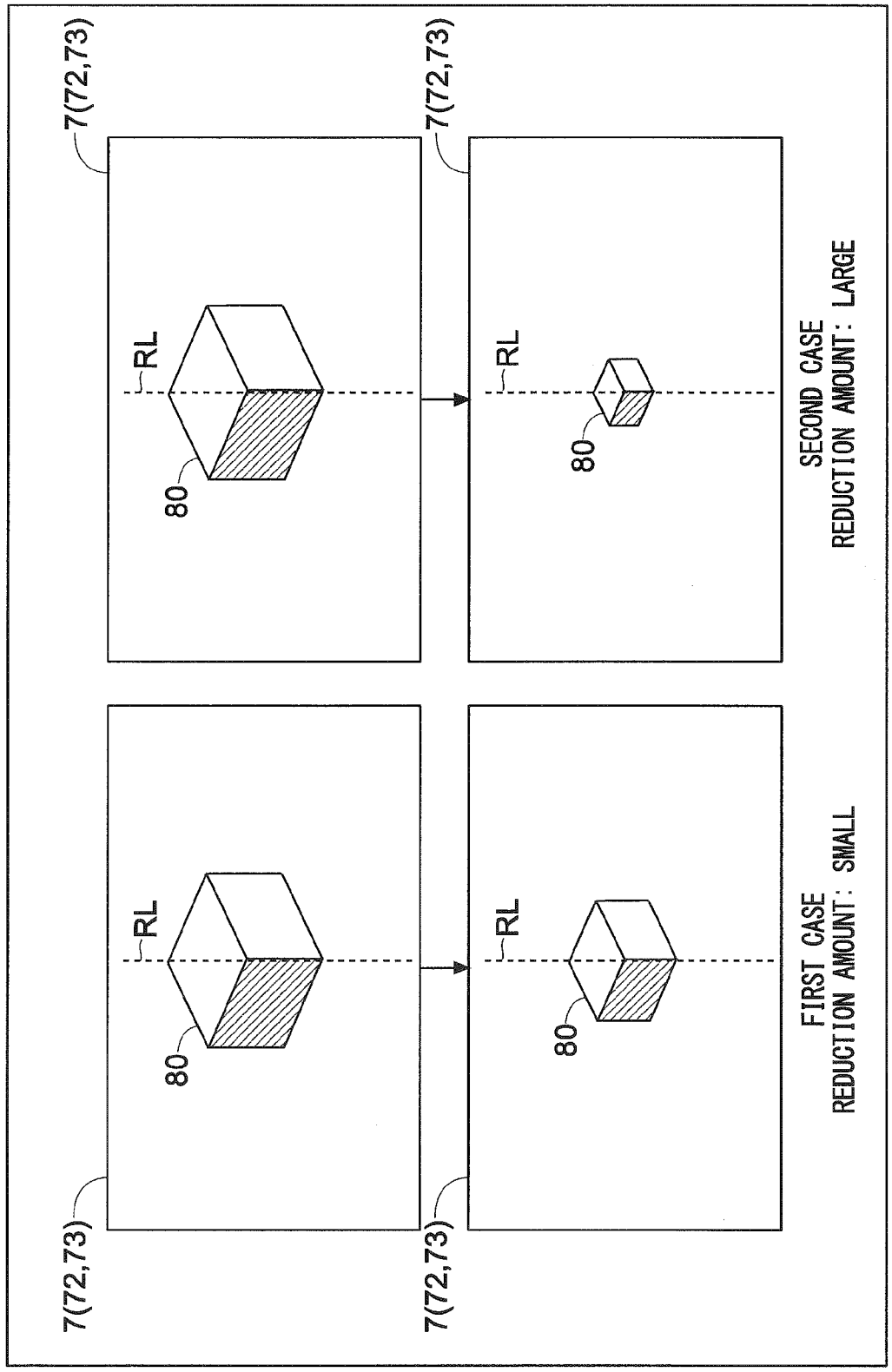
FIG. 12 is a diagram for illustrating a reduction amount by which is reduced an object that is displayed on an operation panel according to an embodiment of the present disclosure.

Thus, as illustrated in FIG. 11, taking a case of enlarging the object 80 as an example, in comparison between the first case where the distance D between the two points touched in the mode switching operation is small and the second case where the distance D between the two points touched in the mode switching operation is larger than in the first case, even when the predetermined touch point in the display changing operation moves by the same movement amount in the first and second cases, the object 80 is enlarged by a smaller enlargement amount in the first case than in the second case. Besides, as illustrated in FIG. 12, taking a case of reducing the object 80 as an example, in comparison between the first case where the distance D between the two points touched in the mode switching operation is small and the second case where the distance D between the two points touched in the mode switching operation is larger than in the first case, even when the predetermined touch point in the display changing operation moves by the same movement amount in the first and second cases, the object 80 is reduced by a smaller reduction amount in the first case than in the second case.

In the present embodiment, with the above described configuration, in the case of rotating the object 80, the larger the distance is made between the two points touched in the mode switching operation, the larger the rotation angle becomes by which the object 80 rotates per unit movement amount of the predetermined touch point the position of which is moved in the display changing operation. That is, the smaller the distance between the two points touched in the mode switching operation is, the smaller the rotation angle of the object 80 becomes by which the object 80 rotates per unit movement amount of the predetermined touch point the position of which is moved in the display changing operation. Thus, when it is desired to rotate the object 80 by a very small angle, even if the movement amount of the predetermined touch point the position of which has been moved in the display changing operation is large (that is, even when it is not by a very small amount that a finger has been moved in the display changing operation), it is possible to rotate the object 80 by a very small angle by making the distance small between the two points touched in the mode switching operation. Here, when it is desired to increase the rotation angle of the object 80, increasing the distance between the two points touched in the mode switching operation makes it possible to increase the rotation angle of the object 80 by moving a finger only by a little amount in the display changing operation.

In the case of enlarging/reducing the object 80, the larger the distance between the two points touched in the mode switching operation is made, the larger the enlargement amount (the reduction amount) of the object 80 becomes per unit movement amount of the predetermined touch point the position of which is moved in the display changing operation. That is, the smaller the distance between the two points touched in the mode switching operation is made, the smaller the enlargement amount (the reduction amount) of the object 80 becomes per unit movement amount of the predetermined touch point the position of which is moved in the display changing operation. Thus, when it is desired to enlarge (reduce) the object 80 by a very small amount, even if the movement amount of the predetermined touch point the position of which has been moved in the display changing operation is large (that is, even when it is not by a very small amount that a finger has been moved in the display changing operation), it is possible to rotate the object 80 by a very small angle by making the distance small between the two points touched in the mode switching operation.

As a result, in the present embodiment, the operability of the touch operation for rotating the displayed object 80 or the touch operation for enlarging/reducing the displayed object 80 is improved.

Further, in the present embodiment, as has been described above, in the case where the first-detected one of the touches on the two points detected in the mode switching operation is released, the panel control section 120 makes a shift to the rotation mode, and in the case where the second-detected one of the touches on the two points detected in the mode switching operation is released, the panel control section 120 makes a shift to the enlargement/reduction mode. This configuration makes it easy to determine whether to make a shift to the rotation mode or to the enlargement/reduction mode.

In the present embodiment, as described above, when making the display section 72 perform the rotation display, the panel control section 120 sets a straight line passing through one of the two touch points detected in the mode switching operation and the center point CP of the object 80 as the rotation axis RA, and makes the object 80 rotate in a direction around the rotation axis RA. With this configuration, it is possible to appropriately set an axial direction of the rotation axis RA in which the rotation axis RA extends. That is, it is possible to appropriately set the rotation direction of the object 80. This improves user-friendliness.

In the present embodiment, as mentioned above, when making the display section 72 perform the enlargement/reduction display, the panel control section 120 sets a straight line passing through one of the two touch points detected in the mode switching operation and the center point CP of the object 80 as the reference line RL. The panel control section 120 makes the object 80 rotate in a direction around the rotation axis RA. When the movement direction of the predetermined touch point the position of which has been moved in the display changing operation is a direction toward one of the two regions divided by the reference line RL, the panel control section 120 enlarges the object 80; when the movement direction of the predetermined touch point is a direction toward the other region, the panel control section 120 reduces the object 80. With this configuration, it is possible to both enlarge and reduce the object 80 merely by changing a moving direction of the finger that is moved in the display changing operation.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

For example, although the above embodiment has been described by taking as an example a case where the present disclosure is applied to a display input device installed in an image forming apparatus, the present disclosure is also applicable to a display input device that is installed in an apparatus other than an image forming apparatus. Furthermore, the present disclosure is applicable to mobile information terminals such as smart phones and tablet terminals.

Figure 13:
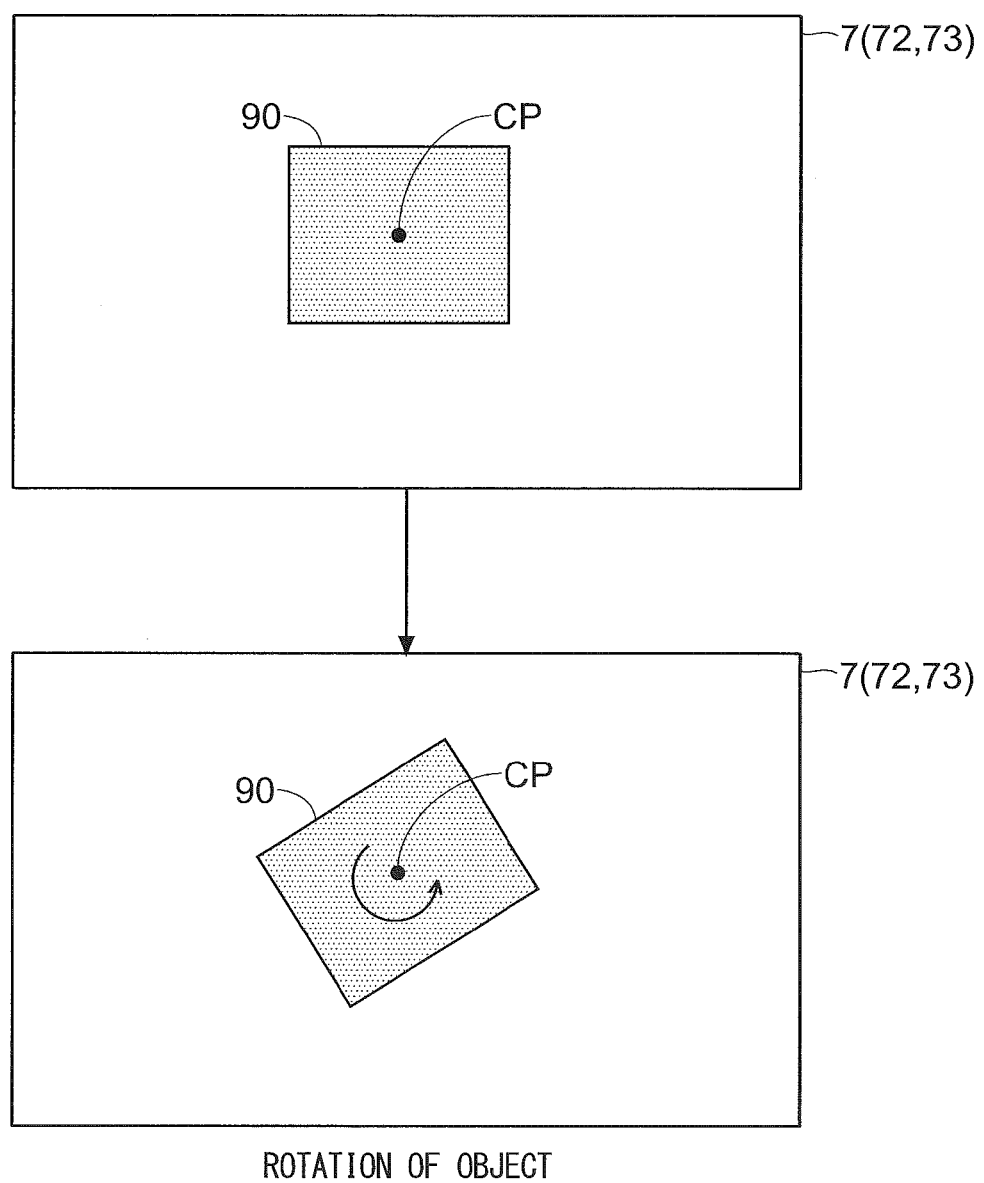
FIG. 13 is a diagram illustrating a case where a two-dimensional object displayed on an operation panel according to an embodiment of the present disclosure is rotated.

The above description of the embodiment has dealt with an example where a three-dimensional object is rotated (enlarged/reduced), but it is also possible to rotate (enlarge/reduce) a two-dimensional object. For example, as illustrated in FIG. 13, in a case where the display changing operation is performed to rotate a two-dimensional object 90, the object 90 rotates with its previously determined center point CP as a rotation pivot.

What is claimed is:

1. A display input device comprising:
   a display section that displays an object;
   a touch panel section for detecting a touch operation, the touch panel section being disposed at the display section; and
   a control section that detects a touch operation based on an output from the touch panel section,
   wherein,
   on detecting that a mode switching operation has been performed on the touch panel section while the object is being displayed, the mode switching operation being a touch operation in which touches at a first position and a second position on the touch panel section overlap in time and then, while the touch at the second position is maintained, the touch at the first position different from the second position is released, the control section makes a shift to a rotation mode or to an enlargement/reduction mode,
      in a case where a shift has been made to the rotation mode, when a display changing operation is performed on the touch panel section, the display changing operation being a touch operation in which a touch is newly made on a third position on the touch panel section separately from the touch at the second position and then the second or third position is moved, the control section makes the display section perform a rotation display in which the object is rotated according as the second or third position is moved, the control section making the display section increase a rotation angle of the object per unit movement amount of the second or third position according as a distance between the first and second positions in the mode switching operation is larger, and
      in a case where a shift has been made to the enlargement/reduction mode, when the display changing operation is performed on the touch panel section, the control section makes the display section perform an enlargement/reduction display in which the object is enlarged or reduced according as the second or third positions is moved, the control section making the display section increase an enlargement amount or a reduction amount of the object per unit movement amount of the second or third position according as the distance between the first and second positions in the mode switching operation is larger.

2. The display input device according to claim 1, wherein
   the object is a three-dimensional object, and
   when making the display section perform the rotation display, the control section sets a straight line passing through one of the first and second positions in the mode switching operation and a previously determined center point of the three-dimensional object as a rotation axis, and the control section makes the three-dimensional object rotate in a direction around the rotation axis.

3. The display input device according to claim 1, wherein
   when making the display section perform the enlargement/reduction display, the control section sets a straight line passing through one of the first and second positions at which the touches are in the mode switching operation and a previously determined center point of the object as a reference line, and when a movement direction of the second or third position is a direction toward a region on one side of the reference line, the control section makes the display section enlarge the object, whereas when the movement direction of the second or third position is a direction toward a region on another side of the reference line that is opposite from the region on the one side, the control section makes the display section reduce the object.

4. An image forming apparatus comprising the display input device according to claim 1.

5. A display input device comprising:
   a display section that displays an object;
   a touch panel section for detecting a touch operation, the touch panel section being disposed at the display section; and
   a control section that detects a touch operation based on an output from the touch panel section,
   wherein,
   on detecting that a mode switching operation has been performed on the touch panel section while the object is being displayed, the mode switching operation being a touch operation in which two touches are made by touching two points as two touch points on the touch panel section and then one of the two touches is released, leaving one of the two touch points continuously touched as a continuous touch point, the control section makes a shift to a rotation mode or to an enlargement/reduction mode,
   in a case where a shift has been made to the rotation mode, when a display changing operation is performed on the touch panel section, the display changing operation being a touch operation in which a point is newly touched as a new touch point besides the continuous touch point which has been continuously touched ever since the mode switching operation and then a position of the new touch point or of the continuous touch point is moved, the control section makes the display section perform a rotation display in which the object is rotated according as a predetermined touch point moves, the predetermined touch point being a touch point a position of which is moved in the display changing operation, and when making the display section perform the rotation display, the control section makes the display section increase a rotation angle of the object per unit movement amount of the predetermined touch point according as a distance between the two touch points touched in the mode switching operation is larger, and in a case where a shift has been made to the enlargement/reduction mode, when the display changing operation is performed on the touch panel section, the control section makes the display section perform an enlargement/reduction display in which the object is enlarged or reduced according as the predetermined touch point moves, and when making the display section perform the enlargement/reduction display, the control section makes the display section increase an enlargement amount or a reduction amount of the object per unit movement amount of the predetermined touch point according as the distance between the two touch points touched in the mode switching operation is larger in a case where, of the two touches detected in the mode switching operation, one touch that has been detected first is released, the control section makes a shift to one mode of the rotation mode and the enlargement/reduction mode, and in a case where, of the two touches detected in the mode switching operation, another touch that has been detected second is released, the control section makes a shift to another mode of the rotation mode and the enlargement/reduction mode that is different from the one mode.

6. The display input device according to claim 5, wherein the object is a three-dimensional object, and when making the display section perform the rotation display, the control section sets a straight line passing through one of the two touch points detected to have been touched in the mode switching operation and a previously determined center point of the three-dimensional object as a rotation axis, and the control section makes the three-dimensional object rotate in a direction around the rotation axis.

7. The display input device according to claim 5, wherein when making the display section perform the enlargement/reduction display, the control section sets a straight line passing through one of the two touch points detected to have been touched in the mode switching operation and a previously determined center point of the object as a reference line, and when a movement direction of the predetermined touch point is a direction toward a region on one side of the reference line, the control section makes the display section enlarge the object, whereas when the movement direction of the predetermined touch point is a direction toward a region on another side of the reference line that is opposite from the region on the one side, the control section makes the display section reduce the object.

8. An image forming apparatus comprising the display input device according to claim 5.

9. A method for controlling a display input device comprising a display section that displays an object and a touch panel section for detecting a touch operation, the touch panel section being disposed at the display section, the method comprising:

a step of displaying the object at the display section;

a step of making a shift to a rotation mode or to an enlargement/reduction mode when a mode switching operation is detected to have been performed on the touch panel section while the object is being displayed, the mode switching operation being a touch operation in which touches at a first position and a second position on the touch panel section overlap in time and then, while the touch at the second position is maintained, the touch at the first position different from the second position is released; and a step where in a case in which a shift has been made to the rotation mode, when a display changing operation is performed on the touch panel section, the display changing operation being a touch operation in which a touch is newly made on a third position on the touch panel section separately from the touch at the second position and then the second or third position is moved, the display section is made to perform a rotation display in which the object is rotated according as the second or third position is moved, the display section being made to increase a rotation angle of the object per unit movement amount of the second or third position according as a distance between the first and second positions in the mode switching operation is larger, and in a case in which a shift has been made to the enlargement/reduction mode, when the display changing operation is performed on the touch panel section, the display section is made to perform an enlargement/reduction display in which the object is enlarged or reduced according as the second or third positions is moved, the display section being made to increase an enlargement amount or a reduction amount of the object per unit movement amount of the second or third position according as a distance between the first and second positions in the mode switching operation is larger.

\* \* \* \* \*